Figure 3:
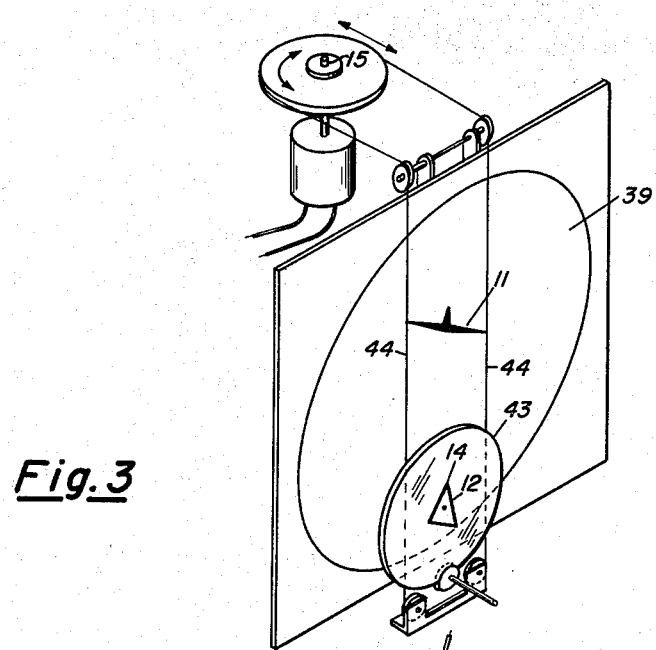

Nov. 22, 1960      L. J. FOGEL      2,960,906
ADVANCED FLIGHT CONTROL INSTRUMENTATION AND CONTROL SYSTEM
Filed Aug. 8, 1957      3 Sheets-Sheet 1
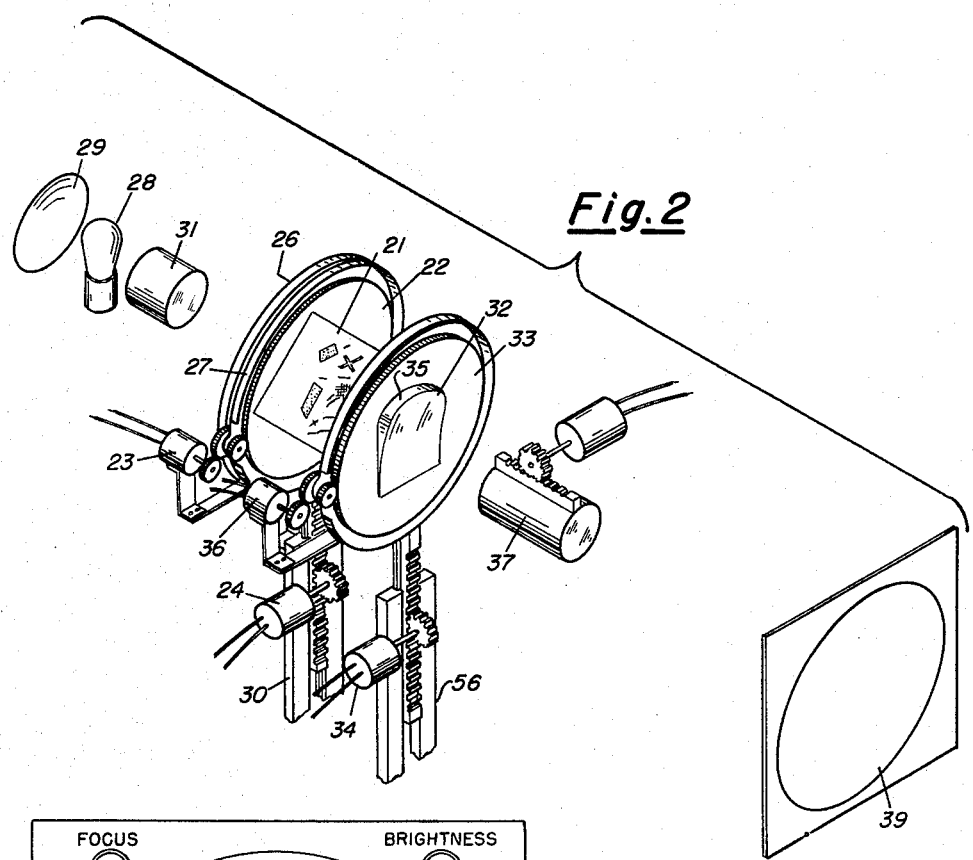
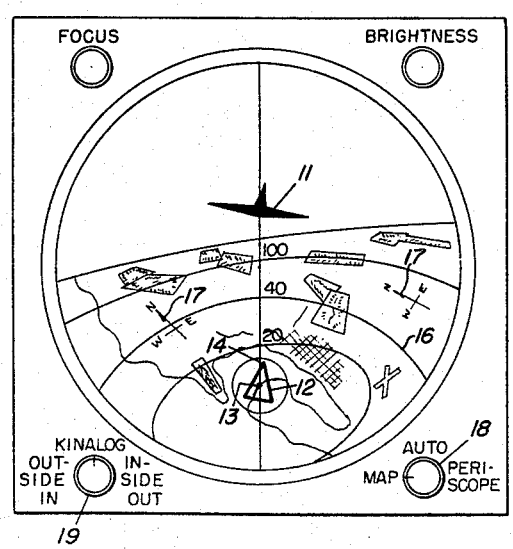
Fig. 1
INVENTOR.
LAWRENCE J. FOGEL Nov. 22, 1960   L. J. FOGEL   2,960,906
ADVANCED FLIGHT CONTROL INSTRUMENTATION AND CONTROL SYSTEM
Filed Aug. 8, 1957

INVENTOR.
LAWRENCE J. FOGEL
BY
ATTORNEY

Nov. 22, 1960 L. J. FOGEL 2,960,906
ADVANCED FLIGHT CONTROL INSTRUMENTATION AND CONTROL SYSTEM
Filed Aug. 8, 1957 3 Sheets-Sheet 3

INVENTOR.
LAWRENCE J. FOGEL
BY
ATTORNEY

United States Patent Office 2,960,906
Patented Nov. 22, 1960

2,960,906

ADVANCED FLIGHT CONTROL INSTRUMENTATION AND CONTROL SYSTEM

Lawrence J. Fogel, San Diego, Calif., assignor to General Dynamics Corporation, San Diego, Calif., a corporation of Delaware Filed Aug. 8, 1957, Ser. No. 677,161

11 Claims. (Cl. 88—1)

This invention relates to display devices and more particularly to an aircraft cockpit display for more effectively displaying information utilized by the operator in the control of his aircraft.

The most informative view taken from an aircraft is produced in looking forward and slightly downward. The forward view through such a "window" yields attitude information while the downward aspect of the same view offers earth reference data. A display of this view, either actual or simulated, integrates a portrayal of bank angle, pitch, yaw, altitude, heading, ground speed and position, and various other flight parameters in a single display in a most natural manner. This "down through the nose" view is usually obscured from the pilot in many types of present-day aircraft. This view can be shown in an "inside looking out" mode, such as in looking out a window with the observer fixed to the aircraft; "outside looking in" mode, such as viewing your own aircraft from a fixed reference point in space or in kinesthetic analog (hereinafter referred to as "kinalog" mode) such as your aircraft would be viewed by the pilot of a chase plane. This last mode eliminates conflict between the operator's kinesthetic sensing system and visually displayed flight data. The desired mode may be selected by the operator for his preferred presentation. Anticipatory information may be provided which gives the operator additional time for decision making so that he may take corrective action in time to combat the various response delays present in the aircraft system. Both visual flight (VFR) and instrument flight (IFR) can be accomplished with the same display, reducing transition time of the operator in changing from one flight mode to the other. In addition, if desired, the radar search PPI information may be presented on this display so that all real world qualitative information may be seen from a single source. Other desired supporting quantitative information would be available to the operator from other indicators on the instrument panel which would probably be more symbolic rather than pictorial in nature. The integrated aircraft display comprising the present invention consists of a viewing screen or lens (which shall henceforth be termed scope) having an aircraft attitude moving member and a ground position moving member (probably in form of the aircraft shadow). Pictorially presented on the scope is an actual view of the earth surface as seen forwardly and downwardly from the aircraft in a "modified pictorial" presentation (a map which emphasizes important navigation check features). An optical system based on a movable prismatic lens is used to distort the map image, foreshortening the terrain as it approaches the horizon. An automatically focusing variable magnification lens keeps the map in focus while changing the magnification to pictorially show the displayed altitude. The map is driven by the navigational equipment of the aircraft while the aircraft representation and the horizon responds to suitable mechanisms sensing aircraft attitude. The ground position indicator rotates to show crab angle or heading and is driven by sensing instruments of the appropriate type. This indicator may also be used to provide anticipatory data to permit earlier corrective action if means has been provided in the system for sensing this information. When contact instead of instrument flight is selected, a wide angle lens and periscope arrangement provides an actual view as seen from the aircraft. The scope could provide for twin lens stereoscopic view of the artificial map display to eliminate required focusing time of the human eye.

It is therefore an object of this invention to provide for an improved visual display for presenting intelligence to the operator of aircraft or other vehicles.

Another object is to provide a visual display presenting contact information, actual or simulated, as seen forward and below an aircraft.

Another object is the provision of a visual display for selectively presenting both contact and/or instrument flight information.

Another object is the provision of a visual display for pictorially presenting instrument flight information in simulated contact flight form.

Another object is the provision of a visual display for presenting integrated anticipatory information as well as actual existing data.

Another object is the provision of a visual display having a plurality of selective modes of pictorial presentation.

Another object is the provision of a visual display having a kinalog mode of artifically adapting members of the display with correct difference information presented for greater pilot compatibility.

Figure 4:
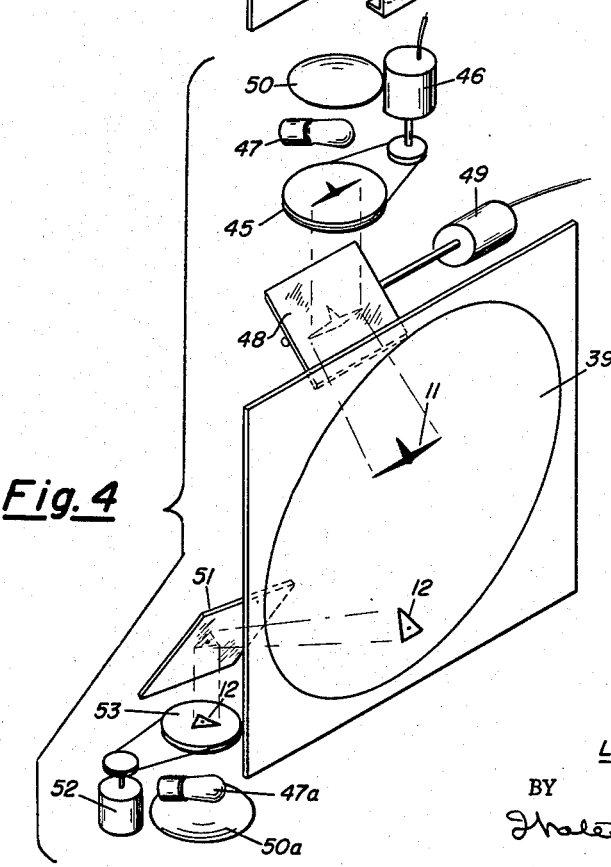
Figure 5:
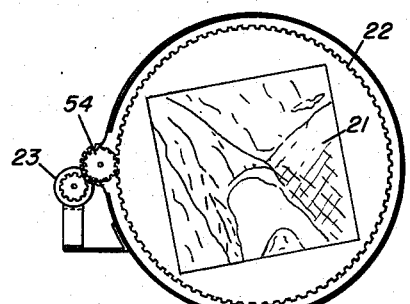
Figure 6:
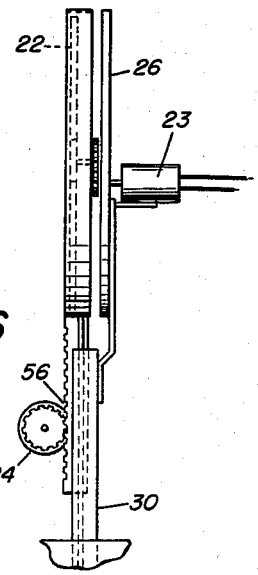
Figure 7:
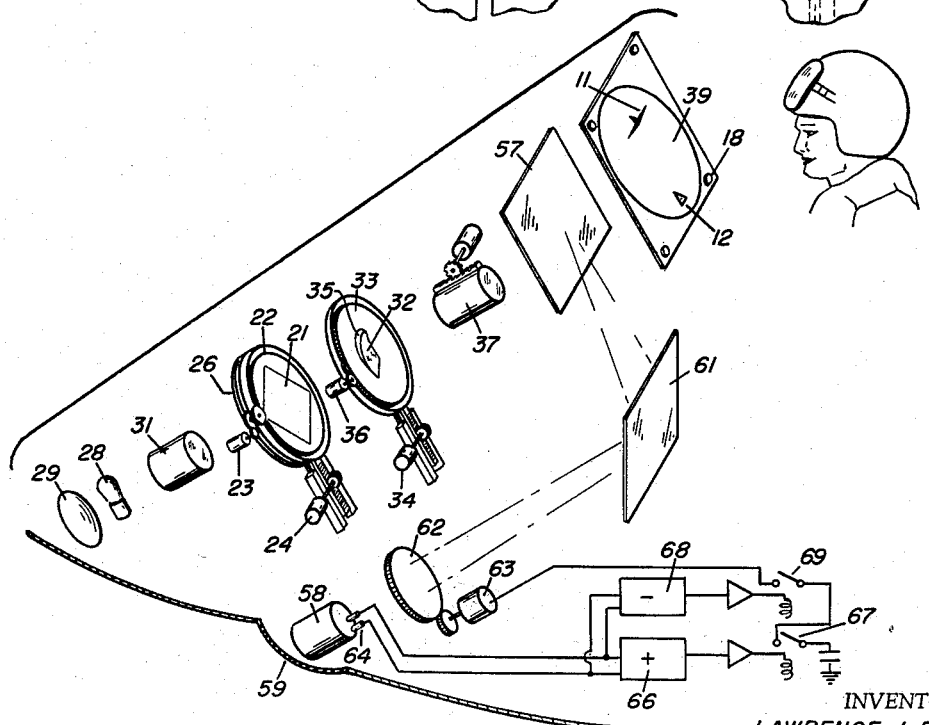

Other objects and features of the present invention will be readily apparent to those skilled in the art from the following specification and appended drawings wherein is illustrated a preferred form of the invention, and in which:

Figure 1 shows the operator's view of the window display,

Figure 2 is a diagrammatic illustration of one type of the map projecting apparatus, Figure 3 shows one method of operating the aircraft symbol and ground position indicator, Figure 4 shows an alternate method, Figures 5 and 6 are a front and side view of the map moving means, and Figure 7 illustrates how contact flying or simulated contact flying is achieved by selectively using a wide angle lens periscope or the modified pictorial map display.

As present-day high performance aircraft are being placed into operational use, it is becoming apparent that the present limiting factors for a satisfactory flight system are the pilot's inherent capabilities. With a multitude of instruments vying for the pilot's attention, each requiring complicated interpretation, and the requirement for hi-speed flights to be made in all environments, a suitable display must be provided for the pilot to analyze his situation without awkward physical and lengthy mental manipulations.

The two extremes of pictorial presentation are outside-in and inside-out. Outside-in display shows an aircraft symbol moving in a stationary space reference. Hence the aircraft symbol moves while the horizon remains horizontal and fixed as seen on the scope. This is as would be seen from a level platform set in space behind the tail of the aircraft. This creates a false impression because in a banked turn, for example, the pilot soon feels the vertical as being colinear with his body due to the imposed G force whereas the display visualizes the vertical as remaining perpendicular to the earth's surface.

The other extreme of attitude presentation is the inside-out. In this display mode the horizon moves while the aircraft symbol remains horizontal. When the pilot makes a banked turn, only the horizon tilts. This type of presentation is preferred by most presently trained pilots since this is the standard training. However, this presentation is not compatible with the pilot's kinesthetic sensing of motion since the pilot feels himself to be in motion while the display shows only the "earth" moving. Further the observed horizon tilt is in the opposite direction to that which he feels. Mental conflict is one of the primary causes of vertigo and is considered dangerous in that it induces longer response delay times for the pilot to react to a situation.

A third type of presentation herein defined as kinalog operates in the continuum between these two extreme types of display. It more nearly portrays the pilot's true bodily feeling in the particular flight maneuver. By dynamic (adaptive) visual coding of the displayed information, the kinalog presentation attempts to make the human, his instruments and the real world compatible. The human receives information and mediates it into a behavioral pattern which has certain dependable time dependent attributes. This is in much the same manner that imposed external forces are transformed by the aircraft system into response through the particular characteristics of inertia, compliance, friction and other time varying and nonlinear factors. Our specific concern is the human's frame of reference which is continually adapting to the environment. In steady state stationary location, the human is considered to have most natural reference to his surroundings through a coordinate system vertically oriented through the body. Things are primarily described as being "above" or "below" and then at some horizontal angle from "dead ahead." If the human body is suddenly tilted, the human judgment coordinate system initially remains fixed in space but as time wears on the frame of reference gradually adapts toward the new orientation of the body. The fiinal adaptation will have some bias unless an artificial acceleration is applied making the sensed G force once again colinear to the body. The data presented in aircraft displays should take this human characteristic into account within the instrument so as to insure against conflict within the operator between what he kinesthetically senses and what he would see on the visual display.

In order to achieve this compatibility a general technique for display is required which subsumes both the inside-out and outside-in modes. In kinalog display the operator views his own aircraft as if he sees it from a chase plane cockpit in nose-to-tail hot pursuit. The chase plane follows by a certain distance thus inducing an exponential lag having the characteristics of the kinesthetic adaptation function for each of the space parameters. Thus in kinalog the aircraft symbol and the earth background are both driven, but in a time dependent manner. For example, if the aircraft suddenly goes into a coordinated right turn, the aircraft symbol tilts in a clockwise direction as in the outside-in display. At the same time, however, the background-horizon begins to tilt in a counter-clockwise direction. When the desired difference angle is reached, the stick is returned to neutral and the symbols move in adaptation, the difference angle remaining fixed. Soon the aircraft symbol is returned to horizontal and the background horizon is tilted as in an inside-out display. The same action follows attitude through any maneuver.

Figure 1 shows a kinalog display presenting a right banked turn before the plane symbol has fully returned to horizontal position. The aircraft symbol 11 moves up or down relative to the horizon to indicate pitch or angle of attack of the aircraft. The aircraft symbol at the horizon indicates level flight. The center 13 of triangle 12 at the bottom of the scope shows the ground position of the aircraft and is rotatable to show aircraft heading. Rings 16 around the triangle indicate range markings which will appear closer together as the aircraft gains in altitude and separate wider as the plane descends in altitude. The terrain shown is displayed as a map which shows only the important navigational check features. An optical system (shown in Figure 2) based on a movable prismatic lens is used to distort the map image, foreshortening the terrain as it approaches the horizon. This prismatic lens is mounted in a mask and has a curved edge 35 to represent the horizon at the thickest portion of the lens. It shows the horizon with a slightly exaggerated curve as it would actually appear from great altitudes. This assists judgment of displayed attitude. The magnification of the map is in undistorted form directly below the aircraft shown toward the bottom of the display. Simplified compass roses 17 appear at map distances which will insure that at least one will be easily readable even at the lowest altitude portions of the enroute mission phase. Although the scaling of the map is optional, an area equal to that of the United States has been placed on a 3" x 4" transparent plate which may then be re-enlarged to any desired size. Thus, a storage area of approximately 1800 miles by 2400 miles is then provided without the problem of indexing separate maps or using strips of film in series. This method of storing information has much greater inherent accuracy due to its dimensional ability whereas the strip film currently used by certain manufacturers is prone to stretch, creep and distort due to temperature, humidity and tension. Only the more prominent navigational land marks are shown on the map. The control 18 in the lower right corner sets the scope for showing the map, a contact periscope view of the earth or a third position marked "auto" which will automatically show either the periscope view or the map depending upon the adequacy of contact conditions. In this manner, the same display may be used either for contact or instrument flying, requiring no transition time by the operator in switching from one form to the other. Control 19 permits the operator to use any of the three modes of presentation as desired.

Fig. 2 is a diagramatic illustration of the map projecting apparatus. Here the map 21 is shown mounted on a rotatable wheel 22 which is connected by servo-means 23 to a ground path sensing device which will rotate the map in accordance with the direction the aircraft is moving. A ground speed velocity sensing means drives a servomotor 24 which drives the map frame 27 in a vertical direction. A range reticle 26 consisting of concentric circles is mounted on the map moving frame 30 but does not move with the map. This is better shown in Figure 6. The map 21 is a transparency which will transmit light from lamp 28 to pass through the map. The lamp has a conventional reflector 29 and a condensor lens 31 and is used in a manner well known in the art. A prismatic distortion lens 32 is mounted on an opaque disc 33 in such a manner as to be moved up and down by motor 34 in response to a pitch sensing mechanism and will rotate in response to bank sensing means actuating the motor 36. When control 19 in Fig. 1 is moved to the outside-in mode of presentation, the bank sensing mechanism only drives the aircraft symbol and the horizon remains in a horizontal position at that time. A variable magnification lens 37 is connected to an altitude sensing means for making the map 21 and range reticles 16 smaller with increasing altitude and larger when the plane descends. The map will always remain in focus however since the variable magnification lens now available on the market have this feature.

Fig. 3 shows one method of operating the aircraft symbol 11 and the ground position indicator 12. Here the triangle is centered on a clear plastic disc 43 which is rotatable in response to a crab-angle or sideslip sensing mechanism. The tip 14 indicates the heading of the aircraft. The aircraft symbol 11 is mounted on two thin wires 44 connected in such a manner that both wings move vertically in response to pitch changes of the aircraft and one wing moves vertically further than the other in response to the bank angle attitude change of the aircraft. In the inside-out mode of presentation the bank angle sensing means moves only the horizon of the map and the aircraft becomes fixed in horizontal position.

In Fig. 4 aircraft symbol 11 is shown as a transparent silhouette on an opaque wheel 45 driven by a motor 46 in response to bank indication means. Light from the lamp 47 transmits through the silhouette 45 onto a rotating mirror 48 which then moves the symbol vertically on the display 39 in response to the pitch actuated motor 49. The ground position symbol 12 is reflected onto the display in a similar manner except that mirror 51 is in a fixed position since it is not desired to move the triangle symbol in a vertical direction. Here the crab-angle actuated motor 52 revolves the silhouette transparency 53 to indicate the aircraft heading. While separate lamps and reflectors are used in displaying the aircraft symbol 11 and the ground position symbol 12, it is apparent that one light projecting source could be used in displaying both symbols.

Fig. 5 and Fig. 6 show the translation and rotation mechanism for driving the map in the manner suggested in Fig. 2. Here the map transparency 21 is mounted on a circular rotatable frame 22 which is rotated by motor 23 to indicate the heading of the aircraft. A spur gear drive 54 of conventional design accomplishes this. The circular frame 22 and gear drive motor 23 are all mounted on a rack and pinion drive 56 so as to be movable in a vertical direction corresponding to the ground speed of the aircraft to which the motor 24 is responsive. A similar arrangement is used in operating the prismatic distortion lens 32 which causes the map image to foreshorten toward a horizon. When used to drive the distortion lens motor 23, now 36, is responsive to the aircraft heading (the lens shows the bank of the aircraft and the map shows the heading). When the outside-in mode is desired this motor 36 is rendered inoperable and the lens 32 with its artificial horizon is maintained in the horizontal position as shown in Figure 2. In moving the distortion lens vertically to indicate pitch attitude motor 24, now 34, drives the rack and pinion drive 56 in response to the pitch attitude of the aircraft.

Fig. 7 illustrates how contact flying is achieved by a wide angle lens periscope or in the alternative the modified pictorial map display may be seen from the same display scope. The map projecting mechanism is the same as that shown in Fig. 2 wherein the lamp 28 reflects light through the condensor lens 31 through the map transparency 21 and range reticle 26 and through the prismatic distortion lens 32, through the variable magnification lens 37 which is altitude driven, and onto the viewing scope 39 where the aircraft symbol 11 and ground position symbol 12 have been displayed. In Fig. 7, however, a half-silvered mirror 57 is placed in the path between the altitude driven variable magnification lens 37 and the viewing scope 39. The wide angle lens 58 is mounted in a viewing window 59 in the outer surface of the aircraft at a position in front of and downwardly from the operator. A mirror 61 reflects the view from the wide angle lens 58 onto the half-silvered mirror 57 which in turn projects the view onto the scope. A variable opacity shutter or aperture diaphragm 62 is placed between the wide angle lens 58 and mirror 61 and has a driven means 63 connected thereto for admitting or shutting out the view intensity from the observer's scope. The driven means 63 may be actuated by control 18 on the face of the scope in Fig. 1 by pointing the indicator 11 for map reading or periscope. Automatic control is also available when the indicator 18 is set at "auto" as shown in Fig. 7. Two or more photo-electric cells 64 view different portions of the wide angle lens. Circuitry is provided so that when sufficient light intensity is available, the plus circuit 66 is activated, closing switch 67. Sufficient light intensity means that the aircraft is either in a bright white cloud or there is sufficient sunlight to see the ground, but it does not discriminate which condition prevails. The negative circuit 68 requires sufficient contrast between the two or more photo-electric cells as in control flight, before switch 69 is closed. Thus, the contrast and intensity discrimination circuit, by closing both switches 67, 69 will operate the drive means 63 which permits the shutter 62 to open and actual contact flight to be possible. Unless the contrast and intensity is sufficiently high, the periscope view is blocked and the operator flies with reference to the pictorial map projected on the display screen. Use of the adjoint periscope may allow for safe elimination of the cockpit windshield and canopy thus greatly reducing the drag.

What I claim is:

1. A situation display device in an aircraft comprising a map mounted for vertical and rotational movement, an optical viewing screen, projecting means forming a light path through said map to said screen, a variable magnification lens in said light path adapted for connection with an altitude sensing device for magnifying the map image on said screen according to altitude of said object above the ground, a prismatic distortion lens mounted in a mask and in said light path having an edge defining an artificial horizon, said lens adapted to foreshorten the map as it approaches said horizon on said screen to thereby present a view of the map simulating the earth as viewed in a direction forwardly and downwardly from said aircraft.

2. A situation display device in an aircraft comprising a map mounted for vertical and rotational movement, an optical viewing screen, projecting means forming a light path through said map to said screen, a variable magnification lens in said light path adapted for connection with an altitude sensing device for magnifying the map image on said screen according to altitude of said object above the ground, a prismatic distortion lens mounted in a mask and in said light path having an edge defining an artificial horizon, said lens adapted to foreshorten the map as it approaches said horizon on said screen to thereby present a view of the map simulating the earth as viewed in a direction forwardly and downwardly from said aircraft, and a range reticle mounted in said light path between said projecting means and said variable magnification lens to thereby superimpose range rings on said map on said screen, said range rings thereby varying in spacing according to the altitude of said aircraft.

3. A situation display device in an aircraft comprising a map mounted for vertical and rotational movement, means for moving said map vertically in accordance with ground velocity of said object and means for rotating said map in accordance with the direction of movement of said object, a viewing screen, projecting means forming a light path through said map to said screen, a prismatic distortion lens mounted in a mask and having an edge defining an artificial horizon, said lens being positioned between said map and said screen, said distortion lens projecting said map onto said screen with said map appearing on said screen foreshortened toward said horizon to thereby present a view of the map simulating the earth as viewed in a direction ahead and downwardly from said aircraft.

4. A situation display device in an aircraft having attitude sensing means, said device comprising a map, an optical viewing screen, means for projecting said map to said screen for viewing thereof, a prismatic distortion lens mounted in a mask and having an edge defining an artificial horizon, said lens being positioned between said map and said screen, said distortion lens projecting said map onto said screen with said map appearing on said screen foreshortened toward said horizon to thereby present a view of the map simulating the earth as viewed in a direction ahead and downwardly from said aircraft, and symbolic means on said screen for illustrating the attitude of said object relative to indicia on the map.

5. A situation display device in an aircraft having attitude sensing means, said device comprising a map, an optical viewing screen, means for projecting said map to said screen for viewing thereof, a prismatic distortion lens mounted in a mask and having an edge defining an artificial horizon, said lens being positioned between said map and said screen, said distortion lens projecting said map onto said screen with said map appearing on said screen foreshortened toward said horizon to thereby present a view of the map simulating the earth as viewed in a direction ahead and downwardly from said aircraft, and symbolic means on said screen for illustrating the attitude of said aircraft relative to indicia on the map, said symbolic means comprising said artificial horizon projected onto said screen and movable thereon by rotary and vertically moving means driven by said aircraft's attitude sensing mechanism.

6. A situation display device in an aircraft having attitude sensing means, said device comprising a map, an optical viewing screen, means for projecting said map to said screen for viewing thereof, a prismatic distortion lens mounted in a mask and having an edge defining an artificial horizon, said lens being positioned between said map and said screen, said distortion lens projecting said map onto said screen with said map appearing on said screen foreshortened toward said horizon to thereby present a view of the map simulating the earth as viewed in a direction ahead and downwardly from said aircraft, and symbolic means on said screen for illustrating the attitude of said aircraft relative to indicia on the map, said symbolic means comprising an aircraft symbol movably mounted thereon and vertically and rotatably driven by said object's attitude sensing mechanism.

7. A situation display device in an aircraft having attitude sensing means, said device comprising a map, an optical viewing screen means for projecting said map to said screen for viewing thereof, a prismatic distortion lens mounted in a mask and having an edge defining an artificial horizon, said lens being positioned between said map and said screen, said distortion lens projecting said map onto said screen with said map appearing on said screen foreshortened toward said horizon to thereby present a view of the map simulating the earth as viewed in a direction ahead and downwardly from said aircraft, and symbolic means on said screen for illustrating the attitude of said aircraft relative to the earth, said symbolic means comprising an aircraft symbol and said artificial horizon, said symbolic means being rotatably and vertically movable on said screen, said symbolic means being driven by said aircraft's attitude sensing mechanism.

8. A situation display device in an aircraft having attitude sensing means, said device comprising a map, an optical viewing screen means for projecting said map to said screen for viewing thereof, a prismatic distortion lens mounted in a mask and having an edge defining an artificial horizon, said lens being positioned between said map and said screen, said distortion lens projecting said map onto said screen with said map appearing on said screen foreshortened toward said horizon to thereby present a view of the map simulating the earth as viewed in a direction ahead and downwardly from said aircraft, and symbolic means on said screen for illustrating the attitude of said aircraft relative to indicia on the map, said symbolic means comprising an aircraft symbol and said artificial horizon, said symbolic means being rotatably and vertically movable on said screen, said symbolic means being driven by said aircraft's attitude sensing mechanism, and selective means for alternately and simultaneously operating both said horizon and said aircraft symbol from said aircraft's attitude sensing mechanism.

9. A situation display device in an aircraft comprising a map mounted for vertical and rotational movement, means for moving said map vertically in accordance with ground velocity of said aircraft and means for rotating said map in accordance with the direction of movement of said aircraft, a viewing screen, projecting means forming a light path through said map to said screen, a prismatic distortion lens mounted in a mask and having an edge defining an artificial horizon, said lens being positioned between said map and said screen, said distortion lens projecting said map onto said screen with said map appearing on said screen foreshortened toward said horizon to thereby present a view of the map simulating the earth as viewed in a direction ahead and downwardly from said aircraft, symbolic means on said screen for illustrating the attitude of said aircraft relative to indicia on the map and a symbol on said screen to identify the ground position of said aircraft.

10. A situation display device in an aircraft in space, a window in said aircraft for presenting a view forwardly and downwardly from said aircraft, a viewing screen, projecting means for presenting said view on said screen, a variable opacity shutter between said window and said screen for blocking said view on said screen, light intensity and discrimination means for automatically controlling said variable opacity shutter, a map, means for projecting said map on said screen, means for superimposing said map view and view from said window on said screen comprising a light transmitting and reflecting device in the path between said map and said screen and between said window and said screen whereby said device transmits one view and reflects another view to said screen from said device along a single viewing path between said device and said screen.

11. A situation display device in an aircraft to present said aircraft's position relative to the earth, said display including a screen, means projecting a horizon and earth identifying indicia thereon, symbol means presenting an aircraft representing symbol on said screen to indicate said aircraft's pitch and bank attitude, means for fixedly positioning said symbol on said screen and moving said horizon vertically and rotatably to indicate said aircraft's attitude in an "inside-out" mode of presentation, means for fixedly positioning said horizon on said screen and rotatably and vertically moving said symbol to indicate said aircraft's attitude in an "outside-in" mode of presentation, means for combining movements of said horizon and said symbol in a kinalog mode of presentation, and means for selectively presenting one of the above modes of presentation.

References Cited in the file of this patent

UNITED STATES PATENTS

| | | |
|---|---|---|
| 521,064 | Weyde | June 5, 1894 |
| 1,745,933 | Kauch et al. | Feb. 4, 1930 |
| 1,753,222 | Timoney | Apr. 8, 1930 |
| 2,267,649 | Graves | Dec. 23, 1941 |
| 2,283,190 | Crane | May 19, 1942 |
| 2,337,363 | Ames | Dec. 21, 1943 |
| 2,420,316 | Hine | May 13, 1947 |
| 2,453,336 | Orser | Nov. 9, 1948 |
| 2,526,682 | Mulberger et al. | Oct. 24, 1950 |
| 2,537,329 | Campbell | Jan. 9, 1951 |
| 2,608,094 | Best | Aug. 26, 1952 |
| 2,650,517 | Falk | Sept. 1, 1953 |
| 2,884,540 | Shockley | Apr. 28, 1959 |

FOREIGN PATENTS

| | | |
|---|---|---|
| 1,135,805 | France | Dec. 22, 1956 |
| 1,146,999 | France | May 27, 1957 |
| 795,001 | Great Britain | May 14, 1958 |